United States Patent [19]
Wisser et al.

[11] Patent Number: 6,010,288
[45] Date of Patent: Jan. 4, 2000

[54] DRIVE-IN DOWEL

[75] Inventors: Erich Wisser, Bregenz, Austria; Markus Hartmann, Mauerstetten, Germany; Kai-Uwe Keller, Feldkirch-Tisis, Austria; Michael Werner, Munich, Germany; Gin-Won Kang, Salez, Switzerland

[73] Assignee: Hilti Aktiengesellschaft, Schaan, Liechtenstein

[21] Appl. No.: 09/169,508

[22] Filed: Oct. 9, 1998

[30] Foreign Application Priority Data

Oct. 10, 1997 [DE] Germany .......................... 197 44 728

[51] Int. Cl.[7] ............................. F16B 13/04; F16B 13/06
[52] U.S. Cl. .................................. 411/30; 411/37; 411/54
[58] Field of Search ............................ 411/30, 31, 37, 411/38, 54, 54.1, 448, 449

[56] References Cited

U.S. PATENT DOCUMENTS

| | | |
|---|---|---|
| 2,329,471 | 9/1943 | King ...................................... 411/449 X |
| 3,107,570 | 10/1963 | Zifferer et al. ............................. 411/37 |
| 4,460,301 | 7/1984 | Wahlstrom ............................... 411/449 |
| 5,755,543 | 5/1998 | Culpen ................................. 411/448 X |

FOREIGN PATENT DOCUMENTS

| | | |
|---|---|---|
| 3536518 | 4/1987 | Germany . |
| 4333471 | 6/1994 | Germany . |

*Primary Examiner*—Neill Wilson
*Attorney, Agent, or Firm*—Brown & Wood, LLP

[57] ABSTRACT

A drive-in dowel formed as a sleeve (2, 22) provided with a load application element (3, 23) and having a front section formed of a plurality of expansion elements separated from each other by longitudinal slots, with each of the plurality of expansion elements being formed of a trailing expansion tab (8, 28) and a leading expansion tab (9, 29) separated by a flexible transitional region (6, 26) and forming with each other an angle ($\alpha$) from about 100° to about 160°, with a front end of the leading tab being located closer to a sleeve longitudinal axis (A) than the flexible transitional region (6, 26); and with the sleeve being provided with a plurality of chisel-like cutters (10) on outer surfaces of respective flexible transition regions (6; 26) which substantially do not project beyond the outer diameter of the sleeve.

11 Claims, 3 Drawing Sheets

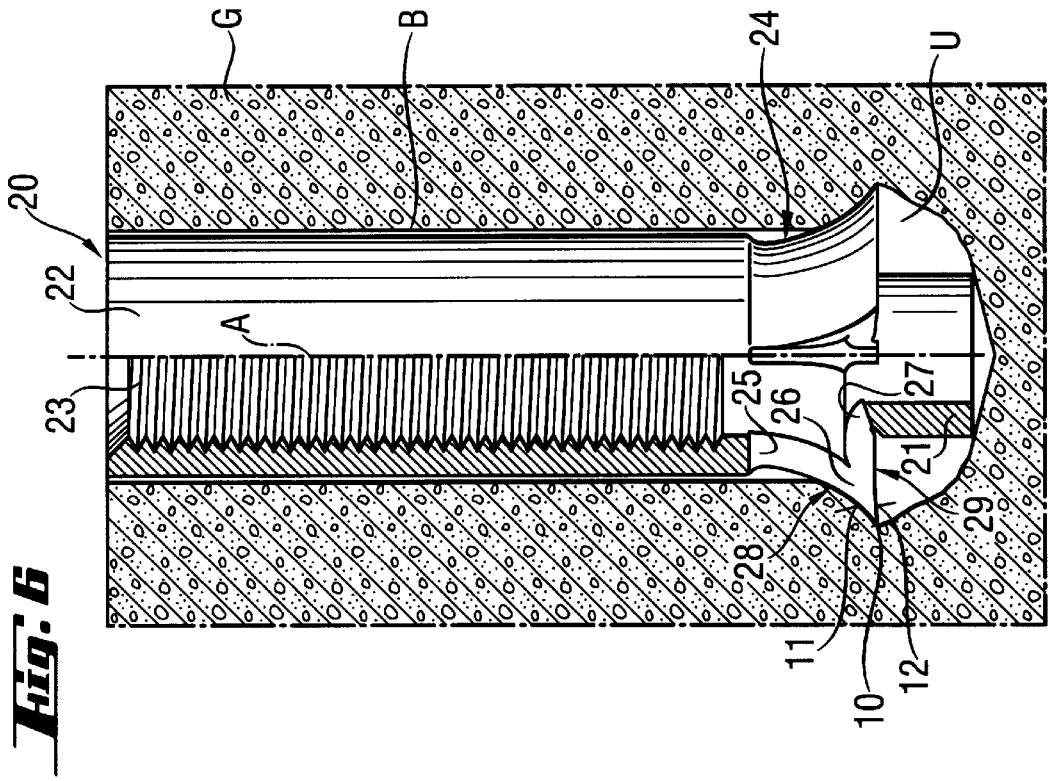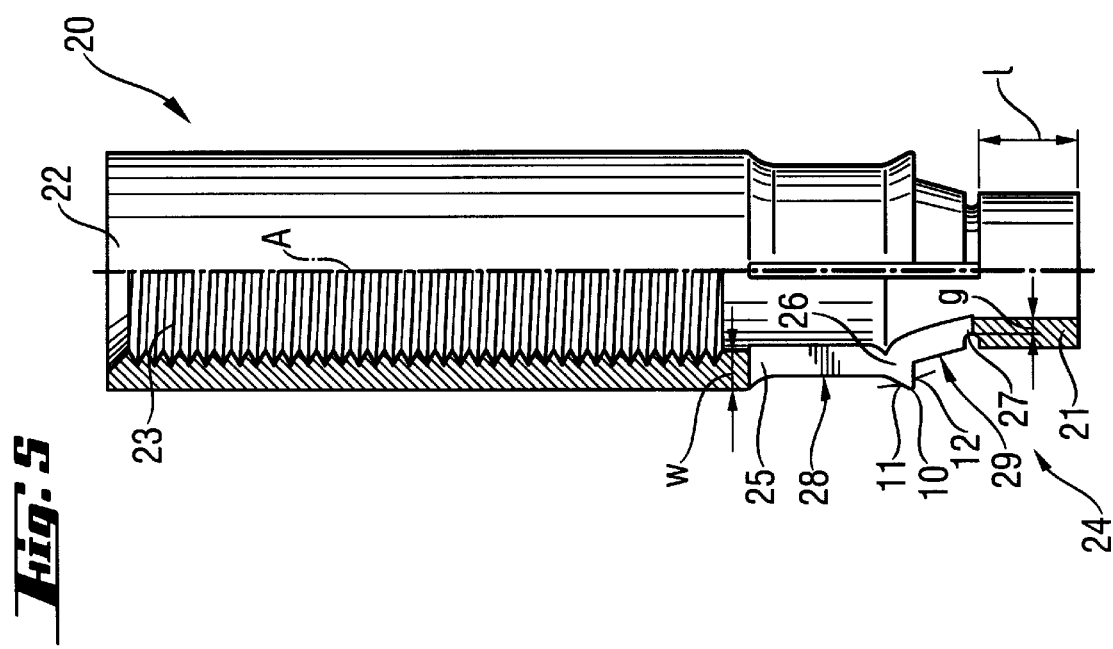

DRIVE-IN DOWEL

BACKGROUND OF THE INVENTION

1. Field of the Invention

The present invention relates to a drive-in dowel formed as a sleeve provided with a load application element formed, preferably, as an inner thread, and having a front section formed of a plurality of expansion elements separated by longitudinal slots.

2. Description of the Prior Art

The anchoring of a known drive-in dowel is based primarily on the expansion principle. The known drive-in expansion dowel is generally formed of two parts and includes a sleeve-shaped dowel body with a conical bore and an expansion member. For anchoring the dowel in a prepared bore, the expansion member is driven into the expansion region of the sleeve-shaped dowel body with hammer blows. As a result, the expansion region of the dowel body is radially expanded and force-lockingly pressed against the bore wall. Forming the dowel of several parts can result in several problems. E.g., the expansion member can be incorrectly inserted into the dowel body bore. The expansion member can fall out of the dowel body bore and become lost. In cases when the expansion member is held outside of the bore of the dowel body, if the hammer blows miss the expansion member, it can become skewed. In order to obtain a desired holding value, high expansion forces are necessary. For keeping, despite the necessary high expansion forces, the drive-in forces small, the expansion member should have an approach angle as small as possible. To this end, the expansion member should have a relatively large length. This results in the expansion member occupying almost a half of the longitudinal extent of the dowel body. Therefore, an anchor rod, which is screwed into the inner thread, can be adjusted only in a very limited range. Because of a relatively small depth the anchor rod is screwed into the inner thread of the dowel body, a large transverse load can result in breaking of the dowel body.

As it has already been mentioned above, high expansion forces are necessary for anchoring in accordance with the expansion principle. High expansion forces lead to large distances between axes and edges of formed attachment points. Because these distances cannot always be obtained, in addition to the use of dowels based on the expansion principle, systems based on a form-locking connection are also used. The systems based on the from-locking connection make use of undercuts which are usually provided in the region of the bore bottom. The anchoring is effected with expansion tabs which are provided on the dowel body and which expand radially into an undercut to form a form-locking connection.

German Publication DE-A 35 36 518 discloses a drive-in dowel to be form-lockingly anchored in a bore provided with an undercut. The drive-in dowel consists of a sleeve provided with an inner thread and supportable on the bore bottom. The sleeve has, in its front region, a plurality of expansion elements. The expansion elements are hingedly connected with the sleeve and are formed of trailing and leading expansion tabs connected by flexors, respectively. The leading tabs extend at an acute angle toward the longitudinal axis of the sleeve and are supported on their front ends. Upon the sleeve being impact-driven into a bore, the expansion elements expand at the flexors and become engaged in the undercut. Upon being expanded, the leading expansion tabs form a flat bottom. The drive-in dowel disclosed in this German publication contrary to the conventional two- or multi-part systems with an undercut, is formed as a one-piece part and consist of a sleeve having an inner thread and expandable expansion elements. However, the one-piece drive-in dowel disclosed in German Publication DE-A 35 36 518 only then can be anchored in a bore when an undercut has been formed in the bore by a separate step. The process of forming an undercut is very time-consuming and requires use of special undercut-forming tools for forming undercuts at a required depth. At that, a precise spacing of the undercut from the bore bottom must be insured because otherwise there exists a danger that the expansion tabs would not expand or would not completely expand.

Accordingly, an object of the present invention is to eliminate the drawbacks of the conventional or known drive-in dowels. Another object of the present invention is to provide a one-piece dowel which can be anchored in bore by applying only axial hammer blows. The drive-in dowel should be capable of being form-lockingly anchored, thereby providing for small distances between axes and edges of attachment points. The drive-in dowel should be capable of being form-lockingly anchored without a need in an additional operational step requiring a special undercut-forming tool for forming the undercut at an exactly predetermined distance from the bore bottom.

SUMMARY OF THE INVENTION

These and other objects of the present invention, which will become apparent hereinafter, are achieved by providing a drive-in dowel formed as a sleeve provided with load application means and having a front section formed of a plurality of expansion elements separated from each other by longitudinal slots, with each of the plurality of expansion elements being formed of a trailing expansion tab and a leading expansion tab separated by a flexible transitional region and forming with each other an angle from about 100° to about 160° with a front end of the leading tab being located closer to a sleeve longitudinal axis than to the flexible transitional region, and with the sleeve having a plurality of chisel-like cutters provided on outer surfaces of respective flexible transitional regions and which do not substantially project beyond an outer diameter of the sleeve. Because chisel-like cutters are provided in the transitional regions between the trailing and leading tabs, the drive-in dowel automatically forms an undercut in a bore upon the sleeve being driven into the bore. Upon the sleeve being driven into the bore, the chisel-like cutters are pressed against the bore wall by the expandable expansion tabs and chisel the wall material from the bore wall with each hammer blow. In this way, the drive-in dowel automatically forms an undercut the geometry of which corresponds to the tab geometry. Thus, a separate undercut-forming step is eliminated. Also eliminated is a need in an additional special tool. The setting process of the form-lockingly anchorable drive-in dowel according to the present invention corresponds to a most possible extent to a process of conventionally settable impact expansible dowel. Because the inventive drive-in dowel is formed as a one-piece part, there is no danger of a dowel component, which is necessary for effecting expansion, being lost. Rather, the setting process is even simplified because in a majority of cases, a setting mandrel, which is usually necessary for expanding the conventional expansion dowel, can be eliminated, and the hammer blows can be directly applied to the sleeve rear end. Because the drive-in dowel according to the present invention is anchored without a particular expansion member being arranged in the sleeve bore, a substantially larger portion of the dowel longitudinal extent is available for forming the inner thread, and an anchor rod can be screwed in over a greater length. This increases the possibilities of adjustment of the attachable structural part. Furthermore, due to a greater length of the inner thread available for screwing in of the anchor rod, the danger of a breakdown of the sleeve under an action of a transverse load is eliminated.

According to the present invention, a cutter, which is provided in the transitional region between trailing and leading tabs, is limited by a free surface, which adjoins an outer surface of a respective trailing tab, and a chisel surface which projects from an outer surface of a respective leading tab. The free surface and the chisel surface form with each other an angel of throat of from about 30° to about 90°.

With the selected angle of throat, it is possible to obtain good cutting ratios without a danger of the cutter being subjected to a big deformation under a tensile load of the drive-in dowel.

With the free surface being inclined toward the longitudinal axis of the sleeve at an angle from about 140° to about 175°, axial hammer blows are optimally passed into the bore wall. Advantageously, the free surface extends substantially perpendicular to the longitudinal extent of the leading tab. This insures a particularly effective undercutting process. Simultaneously, the selected angle of throat prevents jamming of the cutters in the structural component.

The cutters can be formed as separate projecting elements. However, preferably, they extend radially over the entire width of the expansion tab and are located closer to the front end of the sleeve than to the transitional regions between respective trailing and leading tabs. Because the cutter extends over the entire width of the expansion tab, the chiseling of the bore wall is also effected over the entire expansion tab width. Actually, the bore wall, in its region corresponding to the longitudinal slot provided between the expansion elements, is not directly chiseled by the cutters. However, the material of the wall is chiseled away in these region by so-called chipping effect.

In the drive-in dowel according to the present invention, the trailing expansion tab has a length which amounts to from about 50% to about 170% of the distance between a respective flexor and the sleeve front end. At that, the length of the leading expansion tab amounts at most to a 1.5 times the difference between the outer diameter of the dowel in the flexor region and the outer diameter of the dowel at the front end of the expansion tab. As a result of the selected geometrical ratios, the leading expansion tab, in an initial position, before the dowel is expanded, forms with bore wall an angle equal to or greater than 20°. After expansion, this angle, with the expanded expansion elements, becomes equal to or greater than 90°. This insures that upon application of a tensile load to the dowel, no reverse deformation of the expansion elements can take place. The selection of the lengths of the trailing and leading expansion tabs is based on a premise that the trailing expansion tab, after expansion, is inclined toward the bore wall at an angle of at least 15°, so that the slippage remains negligible after the application of a tensile load to the dowel. At that, the inclination of the trailing expansion tab to the bore wall, after expansion, should not exceed 60°, so that the slippage, upon loading of the dowel, corresponds primarily to the tensile stress in accordance with the theory of structural mechanics.

The relative position of the trailing and leading expansion tabs with respect to each other is exactly determined when the leading expansion tabs, which extend from respective flexors to the front end of the sleeve, are connected with each other by a support section. The connection region of the leading expansion tabs with the support section is formed as a flexible hinge, and the support section has, in the connection region, an outer diameter which is smaller than an outer diameter of the sleeve measured in the cutter region. As a result of these geometrical relationships, the expansion, upon the sleeve being driven in, is insured even when the expansion tabs engage annular solid elements at both ends.

The annular support section is formed as a cylinder section and has an axial length which amounts to from two-fold-to five-fold of the wall thickness of the sleeve. With the selected length of the support section, sufficient free space remains beneath the cutters for receiving the removable material. Also, the geometrical relationship insure an optimal orientation of the chisel-like cutters relative to the bore wall in a predetermined region with regard to their cutting characteristics. The hinged connections of the leading expansion tab at its opposite ends and the selected length further insures that the leading expansion tab would form with the bore wall an angle equal to or a greater than 90° in its completely expanded condition.

The wall thickness of the sleeve amounts to from about 15% to about 25% of its outer diameter. Advantageously, the outer diameter of the sleeve exceeds the nominal diameter of a screw or a threaded rod, which is screwed in after anchoring of the dowel, by from two to four mm. This makes possible a through mounting. Upon the reduction of the wall thickness outside of the threaded region, care should be taken that despite the presence of slots and the like, at least a net section corresponding to the stressed cross-section of the threaded region remains. At that, the wall thickness in the region of the flexible transitional region between the trailing and leading expansion tabs and, if necessary, in the connection region of the support section is reduced to from about 25% to about 75% of the wall thickness of the sleeve.

A particularly good matching of the radially extending support surface for the formed undercut with the trailing expansion tab is insured, when the outer surface of the trailing expansion tab is formed as a saddle-shaped surface.

For improving the operational characteristics of the cutters, advantageously, they have a greater hardness than the sleeve material. It is advantageous, from the manufacturing point of view, when the cutters are formed integrally with the sleeve. In this case, the cutter outer surface is hardened by heat treatment or is covered with a layer of a hard material.

BRIEF DESCRIPTION OF THE DRAWINGS

The features and objects of the present invention will become more apparent, and the invention itself will be best understood from the following detailed description for the preferred embodiments when read with reference to the accompanying drawings, wherein:

FIG. 5 shows an axial partially cross-sectional view of a second embodiment of a drive-in dowel according to the present invention; and FIG. 6 shows an axial partially cross-sectional view of the drive-in dowel shown in FIG. 5 with the expansion tabs in their expanded condition.

DETAILED DESCRIPTION OF THE PREFERRED EMBODIMENTS

Figure 2:
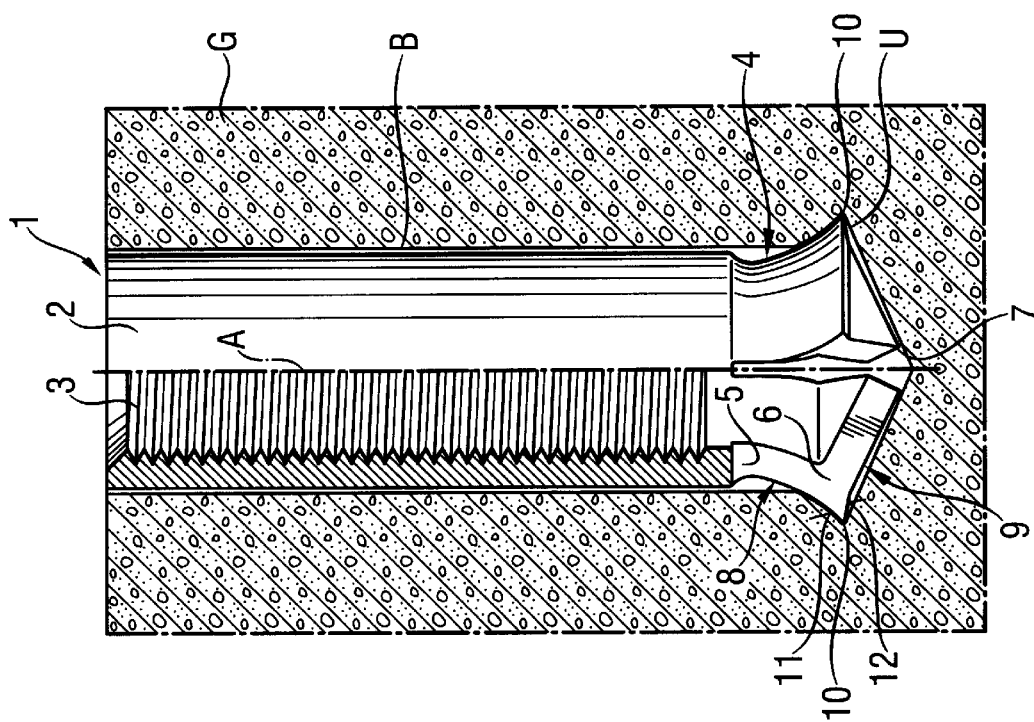
FIG. 2 shows an axial partially cross-sectional view of the drive-in dowel shown in FIG. 1 with the expansion tabs in their expanded condition.
Figure 1:
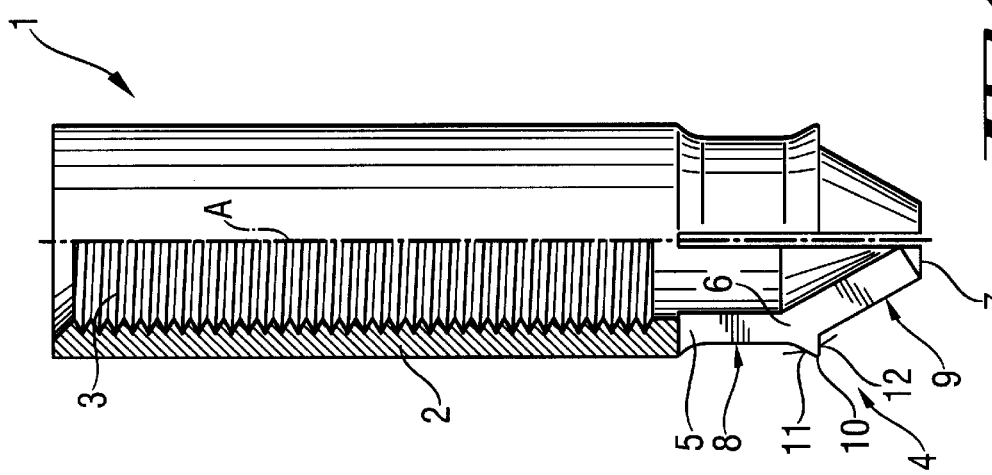
FIG. 1 shows an axial partially cross-sectional view of a first embodiment of a drive-in dowel according to the present invention.

In FIGS. 1 and 2, which show a first embodiment of a drive-in dowel according to the present invention, the dowel is generally designated with a reference numeral 1. The dowel is formed of a metal sleeve 2 which has an inner thread 3 and is provided in its front section 4 with expansion elements separated from each other with axial slots. The expansion elements are connected to the sleeve 2 by a flexible transitional region which is preferably formed as a flexible hinge. The expansion elements are formed of leading tabs 9 and trailing tabs 8 which are connected by flexors 6, respectively. At that, the leading tab 9 is inclined relative to the respective trailing tab 8. The front ends 7 of the leading tabs 9 form the front end of the sleeve 2. The front ends 7 are located closer to the axis A of the dowel 1 than the flexible hinge 5.

Figure 3:
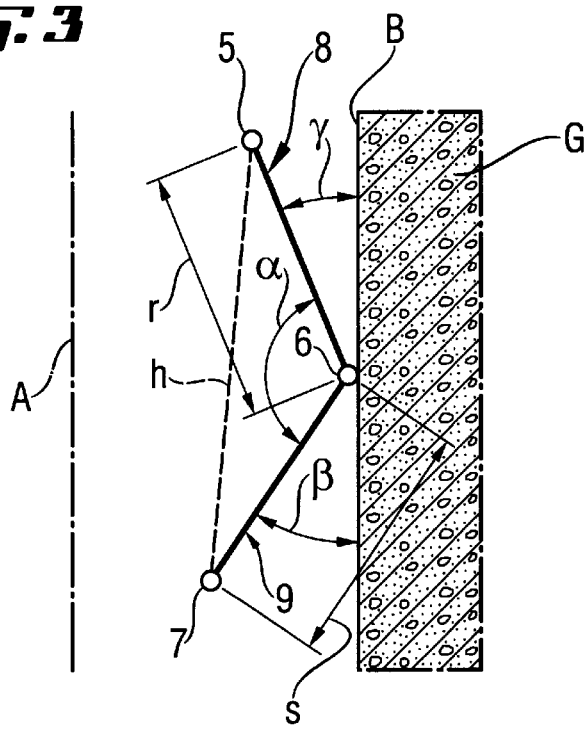
FIG. 3 shows a diagram illustrating geometrical relationships between leading and trailing expansion tabs of the drive-in dowel shown in FIGS. 1–2.

As shown in FIG. 3, the trailing tab 8 and the leading tab 9 form together an angle $\alpha$ which lies within a range from about 100° to about 160°. An outer surface of the leading tab 9 forms with a straight line, which extends parallel to the axis A of the dowel 1, or with a wall of the bore an angle $\beta$. In the initial or non-expanded condition of the tabs, the angle $\beta$ is equal to or greater than 20°. In the end or expanded condition of the tabs, the angle $\beta$ becomes equal to or greater than 90°. An outer surface of the trailing tab 8 forms with the bore wall an angle $\gamma$. In the initial or non-expanded condition of the dowel 1, the angle $\gamma$ is equal from 0° to about 20°. At that, the outer surface of the trailing tab 8 is preferably formed as a saddle-shaped surface. In the end of expanded condition of the expansion tabs 8, 9, the angle $\gamma$ becomes equal to or greater than 15° but never exceeds 60°. As shown in FIG. 3, the flexor 6 of the associated trailing tab 8 and leading tab 9 lies outside of a straight line to which extends from the flexible hinge 5 to the front end 7 of the sleeve 2. In FIG. 3, the straight line h is shown with a dash line. FIG. 3 also clearly shows that the front end 7 is located closer to the axis A of the dowel 1 than the flexible hinge 5. The trailing tab 8 has a length or which amounts from about a half to a double of a distance s between the flextor 6 and the front end 7 or which amounts to the length of the leading tab 9. The selected length and angular relationships between the trailing tab 8 and the leading tab 9 or between the trailing tab 8, leading tab 9 and the dowel axis A and/or the bore wall insure that the trailing and leading tabs 8, 9 would expand in a direction toward the bore wall upon application of axial hammer blows to the dowel 1.

Figure 4:
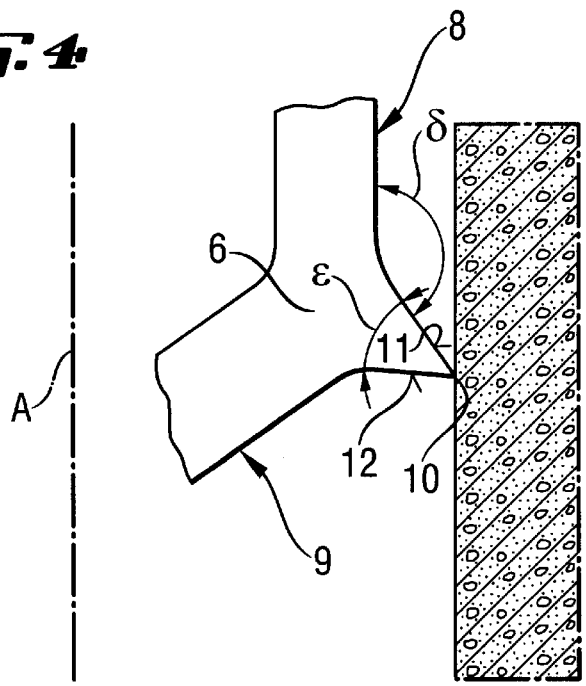
FIG. 4 shows a diagram illustrating geometrical relationships between the expansion tabs and a cutter associated with the expansion tabs.

As shown in FIGS. 1 and 2, in the transitional regions between the trailing tabs 8 and the leading tabs 9, there are provided chisel-like cutters 10 which project radially from the outer surfaces of the tabs 8, 9. A cutter 10 is limited by a free surface 11, which adjoins the outer surface of a respective trailing tab 8, and a chisel surface 12 which projects from the outer surface of the respective leading tab 9. As shown in FIG. 4, the free surface 11 and the chisel surface 12 form an angle of throat $\epsilon$ which amounts from about 30° to about 90°. The free surface 11 is inclined to the sleeve axis A at an angle $\delta$ from about 140° to about 175°. Preferably, the free surface 11 is so inclined that it extends substantially perpendicular to the longitudinal extent of the leading tab 9.

During a setting process, a drive-in dowel 1 is inserted in a bore B formed in a structural component G and having diameter corresponding to the diameter of the insertable dowel 1. The dowel is inserted until the front end 7 abuts the bore bottom. At that, the rear or trailing section of the sleeve 2 still projects from the bore B. The anchoring of the dowel 1 in the bore B is effected by applying hammer blows to the projecting from the bore end of the sleeve 2. As a result of application of the hammer blows, the expansion tabs 8, 9 expand outwardly against the bore wall. The cutters 10, upon complete drive-in of the sleeve 2, form in the bore wall an undercut U the geometry of which corresponds to the shape of the cutters 10 and the shape of the outer surface of the trailing tab 8. In order to be able to chisel the bore wall to form the undercut U, the cutters 10 have a greater hardness than a conventional sleeve material. The hardening of the cutters 10 is insured by a suitable heat treatment. The cutters 10 can also be provided with a hard material layer or be formed entirely of a hard material and be inserted into the outer surfaces of the respective expansion tabs. However, the cutters 10 are preferably formed integrally with the sleeve 2.

In FIGS. 5 and 6 which show a second embodiment of a drive in dowel according to the present invention, the drive-in dowel is designated generally with a reference numeral 20. The dowel body 22 is formed of a metal sleeve 22 provided with an inner thread 23. At the front section of the sleeve 22, there are provided trailing and leading tabs 28, 29 which are separated by respective flexors 26. The trailing tabs 28 are connected with the rest of the sleeve 22 by a flexible hinge 25. In the region of the flexors 26, there are provided chisel-like cutters 10 which correspond to the cutters 10 of the embodiment of a drive-in dowel shown in FIGS. 1–2. That is why they are designated with the same reference numeral. The leading tabs 29 are connected, at their front ends, with an annular support section 21. The outer diameter of the support section 21 is smaller than the outer diameter of the sleeve 2 measured in the region of the cutters 10. The annular support section 21 has a length 1 which amounts to from about two-fold to five-fold of the wall thickness w of the sleeve 2. In the transitional region from the leading tabs 29 to the support section 21, there are provided flexible hinges 27, respectively. The flexible hinges 27 facilitate the expansion of the leading tabs 29. In the region of the flexible hinges 27, the sleeve 22 has a thickness of which is reduced by from about 25% to about 75% of the wall thickness w. The wall thickness w of the sleeve 2 amounts to from about 15% to about 25% of the outer diameter of the sleeve 2. The support section 21 facilitate the expansion of the trailing and leading tabs 28, 29 and insures that the leading tabs 29 are inclined with respect to the axis of the sleeve 22, in the anchored condition of the dowel 20, at an angle of at least 90°.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A drive-in dowel, comprising a sleeve (2; 22) provided with load application means and having a front section formed of a plurality of expansion elements separated from each other by longitudinal slots, each of the plurality of expansion elements being formed of a trailing expansion tab (8, 28) and a leading expansion tab (9, 29) separated by a flexible transitional region (6, 26) and forming with each other an angle (α) from about 100° to about 160°, with a front end of the leading tab being located closer to a sleeve longitudinal axis (A) than the flexible transitional region (6, 26); and a plurality of chisel-like cutters (10) provided on outer surfaces of respective flexible transitional regions (6; 26) and which substantially do not project beyond an outer diameter of the sleeve (2; 22), wherein a cutter (10) is limited by a free surface of a respective trailing tab (8, 28) and a chisel surface of a respective leading tab (9, 29), the free surface (11) and the chisel surface (12) forming with each other an angle of throat (ε) of from about 30° to about 90°.

2. A drive-in dowel according to claim 1, wherein the free surface (11) is inclined to the sleeve longitudinal axis (A) at an angle (δ) from about 140° to about 175°.

3. A drive-in dowel according to claim 2, wherein the free surface (11) extends substantially perpendicular to a longitudinal extent of the leading expansion tab (9, 29).

4. A drive-in dowel, comprising a sleeve (2; 22) provided with load application means and having a front section formed of a plurality of expansion elements separated from each other by longitudinal slots, each of the plurality of expansion elements being formed of a trailing expansion tab (8, 28) and a leading expansion tab (9, 29) separated by a flexible transitional region (6, 26) and forming with each other an angle (α) from about 100° to about 160°, with a front end of the leading tab being located closer to a sleeve longitudinal axis (A) than the flexible transitional region (6, 26); and a plurality of chisel-like cutters (10) provided on outer surfaces of respective flexible transitional regions (6; 26) and which substantially do not project beyond an outer diameter of the sleeve (2; 22), wherein the flexible transitional region is formed as a flexor, and wherein a cutter (10) extends radially over an entire width of the expansion element and is located closer to the front end (7) than to the flexor (6; 26).

5. A drive-in dowel according to claim 4, wherein the trailing expansion tab (8, 28) has a length (r) which amounts to from about 50% to about 170% of a distance between the flexor (6; 26) and the front end (7).

6. A drive-in dowel according to claim 5, further comprising an annular support section (21), and wherein the leading tabs (29), which extend from respective flexors (26) to the front end (7) of the sleeve (22), are connected with each other by the support section (21), with a connection region of the leading expansion tabs (29) with the support section (21) being formed as a hinge (27), and with the support section (21) having, in the connection region, an outer diameter which is smaller than an outer diameter of the sleeve (22) measured in a region of cutters (10).

7. A drive-in dowel according to claim 6, wherein the annular support section (21) is formed as a cylinder and has a length (l) which amounts to from two-fold to five-fold of a wall thickness (w) of the sleeve (22).

8. A drive-in dowel according to claim 6, wherein a wall thickness of the sleeve (22) amounts to from about 15% to about 20% of a sleeve outer diameter, and wherein the wall thickness (g) in the transitional region (6, 26) of the trailing and leading tabs (8, 9: 28, 29) and in the connection region (27) of the support section (21) is reduced to from about 25% to about 75% of the wall thickness (w) of the sleeve (22).

9. A drive-in dowel, comprising a sleeve (2; 22) provided with load application means and having a front section formed of a plurality of expansion elements separated from each other by longitudinal slots, each of the plurality of expansion elements being formed of a trailing expansion tab (8, 28) and a leading expansion tab (9, 29) separated by a flexible transitional region (6, 26) and forming with each other an angle (α) from about 100° to about 160°, with a front end of the leading tab being located closer to a sleeve longitudinal axis (A) than the flexible transitional region (6, 26); and a plurality of chisel-like cutters (10) provided on outer surfaces of respective flexible transitional regions (6; 26) and which substantially do not project beyond an outer diameter of the sleeve (2; 22), wherein the cutters have a greater hardness than that of a sleeve material.

10. A drive-in dowel according to claim 9, wherein the cutters are formed integrally with the sleeve (2, 22).

11. A drive-in dowel, comprising a sleeve (2; 22) provided with load application means and having a front section formed of a plurality of expansion elements separated from each other by longitudinal slots, each of the plurality of expansion elements being formed of a trailing expansion tab (8, 28) and a leading expansion tab (9, 29) separated by a flexible transitional region (6, 26) and forming with each other an angle (α) from about 100° to about 160°, with a front end of the leading tab being located closer to a sleeve longitudinal axis (A) than the flexible transitional region (6, 26); and a plurality of chisel-like cutters (10) provided on outer surfaces of respective flexible transitional regions (6; 26) and which substantially do not project beyond an outer diameter of the sleeve (2; 22), wherein the outer surface of the trailing expansion tabs is formed as a saddle-shaped surface.

* * * * *